United States Patent [19]

Guha

[11] 4,153,256
[45] May 8, 1979

[54] TANGENTIAL TRACKING TONEARM

[75] Inventor: Dwipendra N. Guha, Calcutta, India

[73] Assignee: Avnet, Inc., New York, N.Y.

[21] Appl. No.: 854,481

[22] Filed: Nov. 25, 1977

[51] Int. Cl.² ............................................. G11B 3/28
[52] U.S. Cl. .................................................. 274/23 A
[58] Field of Search ................................... 274/23 A

[56] References Cited

U.S. PATENT DOCUMENTS

| | | | |
|---|---|---|---|
| 1,933,400 | 10/1933 | Victor | 274/23 A |
| 3,826,505 | 7/1974 | Birch | 274/23 A |
| 3,920,249 | 11/1975 | Birch | 274/23 A |

Primary Examiner—Charles E. Phillips
Attorney, Agent, or Firm—Richard P. Crowley

[57] ABSTRACT

A tonearm system is provided in accordance with the invention in which the tonearm is mechanically maintained in tangential tracking relationship in the groove in a record during the playing thereof, the record being mounted on a rotating turntable. The principle of the mechanical system according to the invention is to provide the tonearm in fixed relationship with a bracket combination capable of pivoting the tonearm horizontally on a vertical axis which bracket in turn is adapted to rotate about a secondary vertical pivotal axis, this axis being in fixed relationship to the axis of the turntable and the record being played.

4 Claims, 2 Drawing Figures

TANGENTIAL TRACKING TONEARM

BACKGROUND OF THE INVENTION (1) Field of the Invention

This invention relates to a record player and, in particular to a tonearm system for use with a record player providing tangential tracking of the stylus in the groove of the record being played.

(2) Description of the Prior Art

In record players which contain a rotatable turntable for supporting grooved disc records for playing, either of the mono or stereo variety, there is typically provided a tonearm mounted for horizontal swinging movement about a fixed vertical pivot axis, which vertical pivot axis is offset from and is located outside and adjacent to the peripheral rim of the turntable. The stylus of such a tonearm system typically describes an arc as it tracks the record groove, swinging in a generally clockwise direction as the record is played (assuming an outside-in recording).

It is most desirable that tangency be maintained between the tonearm/stylus and the record groove during play, as a lack of tangency gives rise to tracking distortions, and undesirable stylus/groove side pressures generated on the inner side of the stylus because of the frictional force (called "skating force") between the stylus and the walls of the groove of the record.

Any lack of tangency of the stylus with the record groove is undesirable in playing monaural records, but is especially undesirable when playing stereo records containing separate audio channels on opposite sides of the record groove. The reason for this is that not only are distortions introduced, but audio balance is disturbed due to the unbalanced side pressures.

Over the years various means have been provided to achieve tangency between the grooves of a record being played and the central line or axis of the tonearm or pickup and stylus. One means to accomplish this tangential relationship has been to offset the tonearm in which the pickup is supported by a bent arm and to so mount the pickup that it describes an arc across the record. While this maintains relatively good tangency to the groove area over the range of radii covered in modern recordings, it suffers from the disadvantage, (1) that tangency is really only an approximation, and (2) that undesirable side pressures are produced on the stylus so that while the pickup body may be tangential, the stylus itself is pushed out of tangency and the unbalanced forces on the stylus and its supporting mechanism create displacement and distortions which are quite serious.

Another means to accomplish this desired tangential relationship between the stylus and the record groove has been to provide the cartridge itself at an angle to the tonearm. Tonearm systems incorporating such a system are sometimes provided not only with means to adjust the tracking angle, but also means to counter the "skating force", i.e. the inward force during record play which applies lateral forces against the inner groove wall of a record, otherwise desirable minimum record wear and optimum tracking is not achieved.

Straight line motion of the tonearm, or pickup, other than a swinging arc, which tends to assure tangency has been an alternative approach by some in the prior art and various tonearm systems of this type have been provided. An example of such a system is shown in U.S. Pat. No. 2,915,315 wherein there is disclosed a support for a conventional phonographic pickup which is mounted on a moveable carriage and which is driven by an external motor which causes the carriage to maintain the pickup in essentially straight line motion at the stylus tip.

A desire in more recent times is also to make the stylus mass even smaller. Thus, in U.S. Pat. No. 3,356,372 there is disclosed not only a means for moving a stylus in a radial line as a grooved, disc record is being played, but one which is a very small lightweight phonograph pickup having a low friction.

Although some of the prior art systems provide for tangential tracking of a tonearm system in record players and have had some success, these tonearm systems more often have been not only unduly mechanically/electrically complex, but quite expensive. Moreover, they often do not satisfy wholly the requirements of a tangential tracking system, particularly where use of a very low mass tonearm is also desired.

SUMMARY OF THE INVENTION

There is provided by my invention a record player comprising a simple, relatively inexpensive, tonearm system for use in combination with a turntable adapted to play a grooved disc record wherein the tonearm system provides tangential tracking of the stylus of the tonearm thereby reducing distortion and skating forces experienced by the stylus, and, moreover, comprises the employment of a low mass tone arm.

In conventional tonearm systems for record players, there typically is employed a tonearm supported by a horizontal pivot bracket and a vertical pivot bracket. The horizontal pivot bracket is supported by a bearing which lies in a horizontal plane, but which axis allows the tonearm to move vertically in respect to the turntable. Thus, the tonearm is provided to always rest horizontally on the uppermost record. The vertical pivot bracket is supported by a bearing lying in the vertical plane, and the vertical pivot bracket allows the tonearm to pivot horizontally in respect to the turntable. Typically, the horizontal and vertical pivot brackets coincide and the vertical axis of the vertical pivot bracket is kept fixed relative to the turntable axis.

I have now discovered that the employment of a moveable vertical axis for the tonearm, in combination with a guide means associated with the turntable and tonearm provides for a simple, inexpensive, tangentially tracking tonearm system. The employment of two vertical pivot axes for the horizontal pivotal movement of the tonearm is preferred, one vertical axis being fixed, and the other being moveable. The moveable vertical axis is disposed with respect to and intersects the horizontal axis of the tonearm system.

In the tonearm system of my invention, the tonearm pivoted for horizontal movement of the tonearm on two vertical axes and for vertical movement on a horizontal axis, is combined with a guide means which is located adjacent to the edge of the circular shaped turntable. Desirably, the guide means is circular shaped and is located concentric to the turntable. The guide means of the invention has an outside edge located at a radial distance from the axis of the turntable such that the distance equals the tonearm effective length. The tonearm effective length is defined as the distance between the moveable vertical axis of the tonearm and the stylus tip of the stylus at the end of the tone arm, as measured on a horizontal plane parallel to the surface of the rotatable turntable. A guide-lever means, having a straight edge that passes through the moveable vertical axis of the tonearm, is mounted at 90 degrees to the axis of the tonearm.

In accordance with the invention, the tonearm with the stylus tip is allowed to move in a vertical plane employing the horizontal pivot axis associated with the moveable vertical pivot axis, the horizontal pivot axis being located at a right angle to the tonearm. In the tonearm system of the invention, unlike conventional tonearm systems where the vertical pivot axis of the tonearm is kept fixed relative to the turntable axis, the moveable vertical pivot axis is mounted for horizontal pivotal movement around a rotatable member, which rotates about a fixed vertical pivot axis.

In the operation of my tangential tracking tonearm system, the tangential force on the stylus tip of the tonearm by the record groove, during rotation of the record on the surface of the turntable while the record is playing, causes both the tonearm to pivot about its moveable vertical axis and the rotatable member to pivot on its fixed vertical axis until the guide-lever means is in contact with the guide means. The guide-lever means remains, during playing of the record, in constant contact with the outside edge of the guide means. As the guide means, in the case of a circular shaped guide, is concentric with the axis of the turntable and the record being played, the guide-lever means is always tangential when it contacts the guide means. As the angle the guide-lever means makes with the tonearm is also 90 degrees, this provides that the tonearm and stylus axis is always tangential to the record groove, irrespective of its position on the record. Thus, in my system, tangential tracking of the tonearm and stylus is accomplished by a simple and economical means.

A further advantage with my invention, since any tangential force applied with a record to the stylus tip is balanced out as the guide-lever means contacts the guide means, and tangential tracking is provided, is that no skating force is experienced by the stylus tip. Furthermore, since there is no tracking error, because of the tangential tracking provided by my invention, the tonearm length can be made quite short, limited, of course, only by the particular turntable radius plus any clearance required between the turntable and guide means. This is particularly advantageous as it permits the design and operation of an extremely low-mass tonearm.

Thus, in summary, the tone arm system of the invention provides not only tangential tracking but substantially 0-skating force, and the use of a relatively short, low-mass tone arm in a phonograph and record player.

My invention thus comprises a record player comprising a turntable and a tangential tracking tonearm system which comprises in combination: a turntable mounted for rotation about a central axis and adapted to receive a groove type disc record, either mono or stereo, on the surface of the turntable to be played, the turntable having a peripheral outer edge thereof; a tone arm defining an axis and containing a stylus at one end thereof comprising a stylus tip for tracking the groove of the record on the turntable for playing the record; a guide means disposed adjacent to and spaced just apart from the outer peripheral edge of the turntable, the outer edge of the guide means being at a radial distance equal to the effective length of the tonearm employed; a moveable pivot bracket defining a vertical axis for the tonearm adjacent to the other end thereof to permit the tonearm to have pivotal horizontal movement about said vertical pivot axis; a horizontal pivot bearing and support for the tonearm intersecting with the moveable vertical pivot axis; a horizontal pivot bearing and support to permit the tonearm to have vertical pivotal movement about the horizontal axis; for example, a horizontal pivot bracket and a vertical pivot bracket cooperatively joined at the one end of the tonearm; a secondary vertical pivot bearing and support defining a fixed vertical pivot axis and means connecting the fixed vertical pivot axis with the moveable pivot axis; and a guide-lever means secured to the vertical bearing and support means and extending through the moveable vertical pivot axis and at an angle of 90 degrees to the tonearm axis and extending toward the guide means and overlapping the outer edge thereof whereby, on operation of the record player and the rotation of the turntable and the playing of the record, the tone arm and stylus is maintained in tangential relation to the record groove at all times through the continuous contact of the guide-lever means against the outside edge of the guide means, while the vertical bearing and support means pivots the tonearm to maintain the stylus tip of the tonearm at a tangent to the record groove.

DETAILED DESCRIPTION OF THE INVENTION AND THE PREFERRED EMBODIMENTS THEREOF

Figure 1:
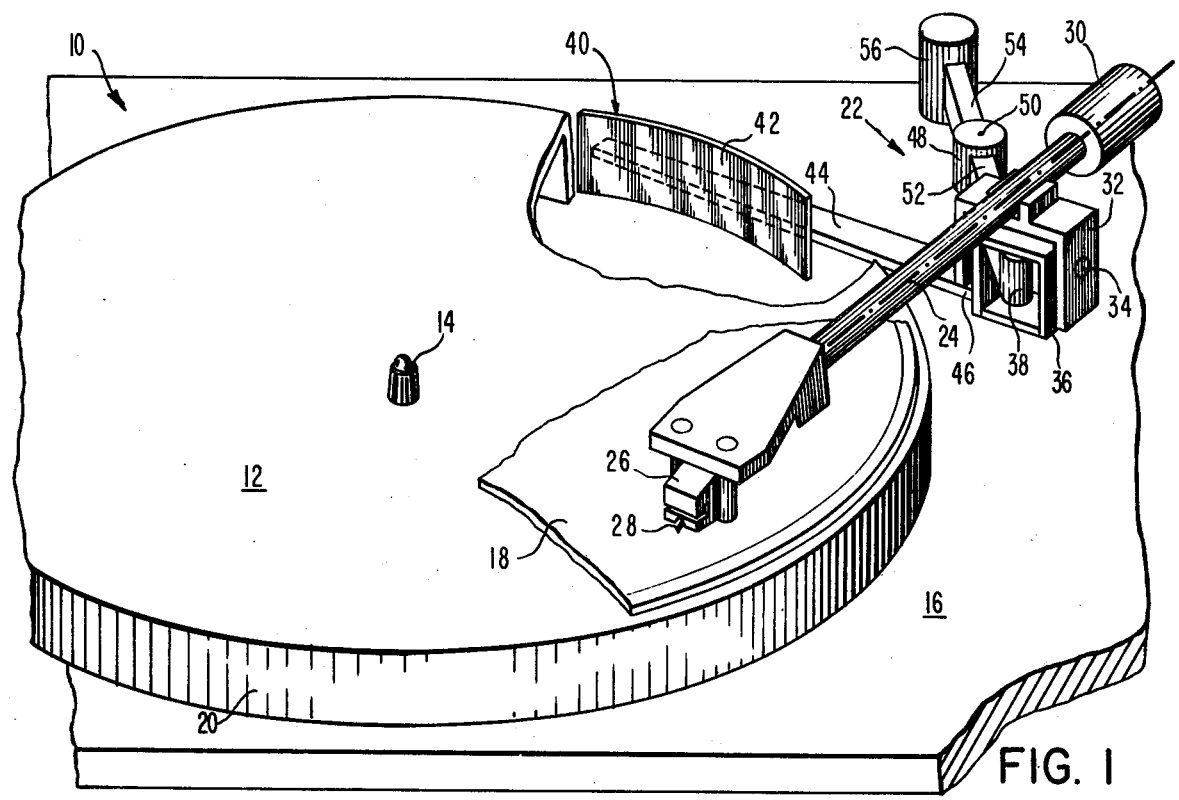
FIG. 1 is an illustrative, perspective, partially sectional view of a record player in which is provided a tangential tracking tonearm system in accordance with my invention.

Referring to the drawing there is shown in FIG. 1 thereof a record player 10 comprising a rotatable turntable 12 mounted for rotation about a central axis 14 comprising a manual spindle for single play operation. However, it will be appreciated that an automatic spindle for support of several records for play automatically can be provided instead, or in addition to, if desired. Turntable 12 is supported on base plate 16, which in turn can be mounted by conventional elastomeric suspension means to a fixed base (not shown).

On the turntable platter, which can be a solid, one piece precision coating having a computer optimized mass, is shown a grooved disc record 18 for play. The circular shaped turntable 12 is of a predetermined radius and has an outer peripheral edge 20. The turntable is adapted to be rotated about central axis 14 by a driving means, such as through a direct-drive or belt-driven motor (not shown).

Tonearm system 22, in accordance with invention, is positioned adjacent the peripheral edge 20 of the turntable 12, and comprises the tonearm 24 having a tonearm axis and which consists essentially of a balanced tubular rod. At the one end of tonearm 24 is provided stylus 26, with a stylus tip 28, the stylus tip adapted to be placed in the groove of the record 18 for playing the record 18, as is conventional. At the other end of the tonearm 24, there is provided a moveable counterweight 30, which provides dynamic zero balance of the tonearm 24. It will be appreciated by reference to FIG. 2 of the drawing that the axis of stylus 26 and stylus tip 28 is in the same vertical plane as the axis of tonearm 24.

Tonearm 24 is fixedly secured to a horizontal pivot bracket 32 at the end adjacent counterweight 30 with the horizontal pivot bracket bearing 34 being in a horizontal plane. This permits tonearm 24 to move in a vertical plane in respect to the turntable 12. Disposed within the horizontal pivot bracket 32, which bracket has the configuration of an inverted U, is a tonearm vertical pivot bracket 36, the bearing for which lies in a vertical plane. This allows tonearm 24 to pivot horizontally in a horizontal plane in respect to the turntable 12. The tonearm vertical pivot bracket 36 defines a moveable, primary, vertical pivot axis 38.

As shown in the drawing, horizontal pivot bracket 32 and vertical pivot bracket 36 are in combination with one another, and in such combination provide for vertical and horizontal pivotal movement, respectively of tonearm 24. Although the combination which provides these functions can be of various structural configurations, the important consideration is that the vertical and horizontal pivot axes intersect. The horizontal pivot bracket 32 and the vertical pivot bracket 36 are disposed for movement on pivot pins which define the respective axes for pivotal movement of the brackets, and hence the tonearm 24. These pivot pins can be spring loaded pivot pins, if desired, which permit adjustment and control of the frictional forces about the respective vertical and horizontal axes.

Figure 2:
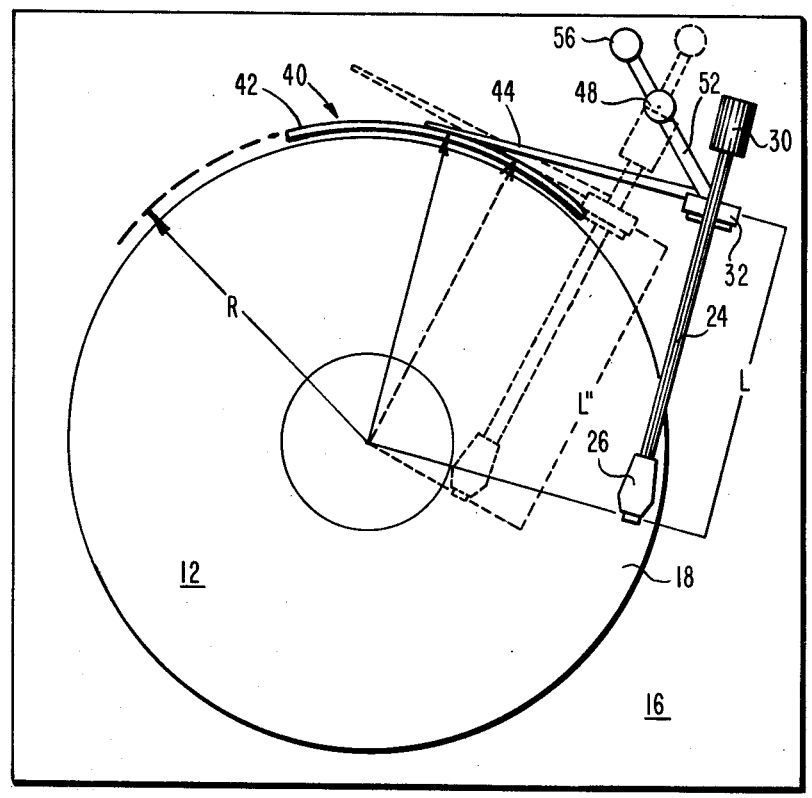
FIG. 2 is a schematic plan view of my tangential tracking tonearm system showing the tonearm in two tangential tracking positions on a record during play.

A guide 40 is located adjacent to the peripheral edge 20 of the turntable 12 and is associated therewith and with tonearm 24, near the tonearm vertical pivot axis. The preferred guide is an arc of a circular shaped rim having predetermined inner and outer radii greater than the radius of the turntable 12, and is positioned so as to be concentric to the turntable 12, adjacent to, but beyond the peripheral edge 20. The guide means 40 is secured to the base plate 16 (not shown). The outside surface 42 of guide 40 has a radius such that $R=L$ (as shown in FIG. 2), where L is the effective length of the tonearm 24. The effective length of tonearm 24 is defined as the distance between the tonearm vertical pivot axis 38, as defined by the vertical pivot bracket 36, and the stylus tip 28, as measured on a horizontal plane parallel to the record playing support surface of turntable 12.

An extended guide-lever means 44 is fixedly connected to the vertical pivot bracket 36 so as to move therewith. The inner straight edge 46 of guide-lever means 44 passes through the tonearm 24 vertical pivot axis. The guide-lever means 44 is mounted on vertical pivot bracket 36 so as to be at an angle of 90 degrees to the tonearm 24 axis, which is the same axis as the stylus-tip 28 axis, as illustrated. The straight edge 46 of guide-lever 44 extends over and just outside of the outer peripheral edge of the guide means 40, and is adapted to be placed in continuous contact with the outer edge of the guide means 40 during the operation of the turntable and the playing of the record, as hereinafter more fully described.

The horizontal pivot bracket 32 and the vertical pivot bracket 36 are supported for horizontal pivotal movement about a secondary, fixed, vertical pivot axis by means of a rotatable member 48 secured for rotation about a pivot pin 50 secured to the base plate 16. Rotatable member 48 has opposed extending arm members 52, 54. The end of arm 52 is positioned within and supports the horizontal and vertical brackets 32 and 36. The other arm 54 is provided with moveable counterweight 56 by means of which dynamic zero balance can be provided of the rotatable member 48. Pivot pin 50 can be spring loaded or adjustable so as to permit adjustment and control of the frictional forces about this secondary vertical axis. Control of the frictional forces about the vertical axis is desirable to insure a more positive contact of guide-lever means 44 with guide means 40. The friction of the primary vertical pivot axis must always be greater than that of the secondary vertical pivot axis to guarantee that the straight edge 46 of the guide-lever means will always contact the outer surface 42 of the guide means.

While the bearings for the pivotal movements can be of various types commercially available, it is much preferred that they be precision gimbal ball bearings. This will provide for minimal horizontal and vertical pivotal friction.

The operation of the tangential tonearm tracking system 22 in accordance with the invention is shown more particularly in the plan view of FIG. 2, which illustrates the movement of the tonearm system in respect to the movement of the tonearm 24 as it moves from the outer periphery of the record 18 inwardly toward the central axis 14, with the tonearm 24 being maintained by my tangential tonearm system 22 in a tangential relationship to a record groove through a horizontal pivotal movement about fixed vertical pivot axis 50. Thus, in operation, when the stylus tip 28 contacts the rotating record 18 in the record groove on the turntable 12, the record groove applies a tangential force on the stylus tip 28, which tends to rotate the tonearm 24, and the tonearm system 22 about the secondary vertical pivot axis by means of the rotatable member 48 rotating about pin 50. This pivotal movement continues until the guide-lever 44 is placed in tangential contact with the outside edge of guide 40.

As the edge of guide-lever means 44 and the axis of tonearm 24 are at 90 degrees with respect to one another, with contact of the outside edge of the guide-lever 44 passing through the tonearm vertical pivot axis, the stylus tip 28 will be maintained tangentially to the record groove during the playing operation, with the guide-lever 44 being in continuous moveable contact with the outside surface 42 of the circular shaped guide means 40 during the playing cycle. The guide-lever means 44 contacts against the outside of the guide means 40, moving from one to the other end thereof as the stylus tip 28 moves toward the central axis 14 during the playing operation, from the outside edge of the record 18 toward the central axis 14 of the turntable 12. Since the guide means 40 is circular with the center thereof concentric with the turntable 12, the guide-lever means 44 is always tangential when it contacts the edge of the guide 40, thus maintaining an angle of 90 degrees.

In operation, as the stylus tip 28 moves from the outside edge of record 18 during playing toward the central axis, as illustrated more particularly in FIG. 2, the horizontal pivot bracket 32 and the vertical bracket 36, and their respective axes, are moveable as the tonearm is maintained at 90 degrees to the record groove through the action of the guide-lever 44 against the guide 40. At the start of the playing cycle, the guide-lever 44 contacts the guide 40 at the one end, and as the tonearm moves inwardly, the contact of the guide-lever 44 with the guide 40 is moved toward the other end, with respective movement of the moveable pivot bracket 36 and the respective tonearm vertical pivot axis as illustrated in the two positions shown in FIG. 2 of the drawing.

In operation, the friction of the tonearm vertical pivot axis should be greater than the friction associated with the secondary vertical pivot axis and rotatable member 48, in order to maintain the guide-lever means 44 in continuous tangential contact with the guide 40. Adjustment of any pivots with spring tension or the like means for the horizontal and vertical axes may be made to insure this continuous contact.

As many different embodiments of this invention will now have occurred to those skilled in the art, it is to be understood that the specific embodiments of the invention as presented herein are intended by way of illustration only and are not limiting on the invention, but that the limitations thereon can be determined only from the appended claims.

What I claim is:

1. A record player for playing grooved disc records on a rotating turntable comprising:
   (a) a circular-shaped rotatable turntable of a predetermined radius having a peripheral edge and mounted for rotation about a central axis;
   (b) a base plate for supporting such a turntable; and
   (c) a tonearm system mounted on said base plate, said tonearm system comprising:
      (i) a tonearm having a tonearm axis, a stylus at one end of said tonearm and a counterweight at the other end of the tonearm;
      (ii) a guide means which comprises an arc of a circular-shaped rim element having a predetermined outer radii surface greater than the radius of the turntable and concentric to the axis of the turntable, the outer radius being equal to the effective length of the tonearm, the rim element positioned in a slightly spaced-apart relationship from and adjacent to the peripheral edge of the turntable and mounted to be concentric to the axis of the turntable;
      (iii) a movable pivot bracket defining a primary movable vertical axis for the tonearm intermediate the one and the other end of the tonearm to provide the tonearm with pivotal horizontal movement about the primary vertical pivot axis;
      (iv) a horizontal pivot bracket defining a horizontal axis for the tonearm, the horizontal axis intersecting with the movable primary vertical pivot axis to provide the tonearm with vertical pivotal movement about the horizontal pivot axis;
      (v) a secondary, fixed, vertical pivot support means defining a fixed vertical pivot axis;
      (vi) extending-arm-connection means connecting the secondary, fixed, vertical pivot axis with the primary movable vertical pivot axis;
      (vii) a guide-lever means having a straight edge for contacting the outer radii surface of the guide means; the guide-lever means extending through the primary movable vertical axis and secured at an angle of ninety degrees (90°) to the tonearm axis, the straight edge extending toward and overlapping the outer edge of the guide means and in contact with the outer radii surface of the guide means; and
      (viii) whereby the frictional forces about the secondary, fixed, vertical pivot axis are the greater than the frictional forces about the primary, movable, vertical pivot axis so as to provide for continuous contact of the straight edge of the guide-lever means with the outer surface of the guide means, whereby, on operation of the turntable, the tonearm and stylus are maintained at all times in a tangential relationship.

2. The record player of claim 1 wherein the connecting means extends away from the fixed vertical pivot axis on the turntable and includes on the extended end a counterweight.

3. The record player of claim 1 which includes as the guide means an arc-shaped, circular rim element having predetermined inner and outer radii sufaces greater than the radius of the turntable.

4. A record player for playing grooved disc records on a rotating turntable comprising:
   (a) a circular-shaped rotatable turntable of a predetermined radius having a peripheral edge and mounted for rotation about a central axis;
   (b) a base plate for supporting such a turntable; and
   (c) a tonearm system mounted on said base plate adjacent to said tonearm system comprising:
      (i) a tonearm having a tonearm axis, a stylus at one end of said tonearm and a counterwieght at the other end of the tonearm,
      (ii) a guide means which comprises an arc of a circular-shaped rim element spaced slightly apart from the peripheral edge of the turntable, the rim element having a predetermined inner and outer radii surface greater than the radius of the turntable and concentric to the axis of the turntable, the outer radius being equal to the effective length of the tonearm,
      (iii) a movable pivot bracket defining a primary movable vertical axis for the tonearm intermediate the one and the other end of the tonearm to provide the tonearm with pivotal horizontal movement about the primary vertical pivot axis,
      (iv) a horizontal pivot bracket defining a horizontal axis for the tonearm, the horizontal axis intersecting with the movable primary vertical pivot axis to provide the tonearm with vertical pivotal movement about the horizontal pivot axis,
      (v) a secondary, fixed, vertical pivot support means defining a fixed vertical pivot axis,
      (vi) extending-arm-connection means extending from the secondary, fixed, vertical pivot axis and connected at the one end with the primary vertical pivot axis and having a counterweight at the other end,
      (vii) a guide-lever means having a straight edge for contacting the outer radii surface of the guide means, the guide-lever means extending through the primary movable vertical axis and secured at an angle of ninety degrees (90°) to the tonearm axis, the straight edge extending toward and overlapping the outer edge of the guide means and in contact with the outer radii surface of the guide means, and
      (viii) whereby the frictional forces about the secondary, fixed, vertical pivot axis are greater than the frictional forces about the primary, movable, vertical pivot axis so as to provide for continuous contact of the straight edge of the guide-lever means with the outer surface of the guide means, whereby on operation of the turntable, the tonearm and stylus are maintained at all times in a tangential relationship.

* * * * *